US006269927B1

United States Patent
Kanenobu et al.

(12) 
(10) Patent No.: US 6,269,927 B1
(45) Date of Patent: Aug. 7, 2001

(54) SPEED CHANGE CONTROL DEVICE IN WORKING VEHICLES

(75) Inventors: Hideki Kanenobu, Ashiya; Jiro Shibata, Amagasaki, both of (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 09/518,840

(22) Filed: Mar. 3, 2000

(30) Foreign Application Priority Data

Mar. 31, 1999 (JP) ............................... 11-091054

(51) Int. Cl.[7] ................................. F16D 25/10
(52) U.S. Cl. ...................... 192/87.18; 192/87.13
(58) Field of Search ................. 192/87.13, 87.18, 192/87.11, 87.1, 85 R, 51; 137/625.64

(56) References Cited

U.S. PATENT DOCUMENTS

| 3,874,255 | * | 4/1975 | Minami | 137/625.64 X |
| 4,262,554 | * | 4/1981 | Ahlen et al. | 475/137 |
| 5,599,247 | * | 2/1997 | Matsufuji | 475/128 |
| 5,669,479 | * | 9/1997 | Matsufuji | 192/87.18 X |

FOREIGN PATENT DOCUMENTS

| 0 419 984 | * | 4/1991 | (EP) . |
| 2668359 | | 10/1997 | (JP) . |

* cited by examiner

Primary Examiner—Rodney H. Bonck

(57) ABSTRACT

A valve casing (55) having plural direction control valves (46H, 46L, 46A, 46B, 46C) and plural pressure sensors (47H, 47L, 47A, 47B, 47C) is mounted on an outer side surface of a vehicle body (2) which includes therein plural fluid-operated clutches (40H, 40L, 43A, 43B, 43C) for changing the vehicle running speed. The control valves are secured to the casing from one of upper and lower surfaces thereof and the pressure sensors are secured to the casing from the other of the upper and lower surfaces such that the valves and the sensors are arranged respectively in parallel in a longitudinal direction of the vehicle body. Preferably, the valve casing is composed of an outer plate member (57) to which the control valves and pressure sensors are secured, an inner plate member (58) comprising plural output ports (60H, 60L, 60A, 60B, 60C) which are connected respectively to the plural fluid-operated clutches, and a separator member (59) interposed between the plate members and having plural fluid passage bores which connect between fluid passages in the outer plate member and fluid passages in the inner plate member.

7 Claims, 13 Drawing Sheets

SPEED CHANGE CONTROL DEVICE IN WORKING VEHICLES

FIELD OF THE INVENTION

This invention relates to a speed change control device having a novel valve mechanism for fluid-operated clutches in a working vehicle in which the vehicle running speed is changed by the operation of plural fluid-operated clutches.

BACKGROUND OF THE INVENTION

In a working vehicle in which the vehicle running speed is changed by the selective operation of plural fluid-operated clutches, it is already known from, for example, Japanese Patent No. 2,668,359 that plural direction control valves for controlling the supply of operating fluid individually to the plural fluid-operated clutches, particularly plural electromagnetic proportional direction control valves which permit the control of fluid pressure applied to the plural fluid-operated clutches, are employed for controlling the vehicle speed and that plural pressure sensors for sensing fluid pressure applied to the individual fluid-operated clutches electrically are employed for preventing abnormal double engagements of the fluid-operated clutches. However, there has not been provided yet a speed change control device which has such plural direction control valves and such plural pressure sensors in close proximity to the plural fluid-operated clutches in a compact manner and for an easy inspection and maintenance.

Accordingly, a primary object of the present invention is to provide a novel speed change control device in which plural direction control valves and plural pressure sensors are provided in close proximity to plural fluid-operated clutches in a compact manner and for an easy inspection and maintenance.

SUMMARY OF THE INVENTION

The present invention relates to a speed change control device in a working vehicle in which the vehicle running speed is changed by the selective operation of plural fluid-operated clutches. According to the present invention, a valve casing (55) is mounted on an outer side surface of a vehicle body (2) which includes the plural fluid-operated clutches. The valve casing has plural direction control valves (46H, 46L, 46A, 46B, 46C) for controlling the supply of operating fluid individually to the plural fluid-operated clutches and plural pressure sensors (47H, 47L, 47A, 47B, 47C) for respectively sensing fluid pressure applied to the plural fluid-operated clutches. The plural direction control valves (46H, 46L, 46A, 46B. 46C) are secured to the valve casing (55) from one of upper and lower surfaces of the casing, and the plural pressure sensors (47H, 47L, 47A, 47B, 47C) are secured to the valve casing (55) from the other of the upper and lower surfaces of the casing. Preferably, the plural direction control valves (46H, 46L, 46A, 46B, 46C) and the plural pressure sensors (47H, 47L, 47A, 47B, 47C) are arranged respectively in parallel in a longitudinal direction of the vehicle body (2).

Because the plural control valves and the plural pressure sensors are secured, according to the present invention, to the valve casing mounted on an outer side surface of the vehicle body which includes the plural fluid-operated clutches, the plural control valves and pressure sensors are in close proximity to the plural fluid-operated clutches, so that the supply of operating fluid to the fluid-operated clutches is controlled quickly and fluid pressure applied to the fluid-operated clutches are sensed precisely. The control valves and pressure sensors secured to the valve casing mounted on an outer side surface of the vehicle body permit an easy access to these valves and sensors for inspection and maintenance thereof. Because the plural control valves are secured to the valve casing from one of upper and lower surfaces thereof and the plural pressure sensors are secured to the valve casing from the other of the upper and lower surfaces thereof, the plural control valves and pressure sensors are arranged in a compact manner. When the plural direction control valves and the plural pressure sensors are arranged respectively in parallel in a longitudinal direction of the vehicle body according to a preferred embodiment of the present invention, the plural control valves and pressure sensors are arranged without enlarging width of the valve casing even when the fluid-operated clutches in the vehicle body are increased in number. Recently, a fuel tank for storing fuel for engine is often provided at an outer side of the vehicle body, and in such a case, too, the speed change control device can be provided in an inner side of such a fuel tank in a compact manner.

According to a preferred embodiment of the present invention, the valve casing (55) is composed of an outer plate member (57) to which the plural direction control valves (46H, 46L, 46A, 46B, 46C) and the plural pressure sensors (47H, 47L, 47A, 47B, 47C) are secured, an inner plate member (58) comprising plural output ports (60H, 60L, 60A, 60B, 60C) which are connected respectively to the plural fluid-operated clutches (40H, 40L, 43A, 43B, 43C), and a separator member (59) which is interposed between the outer and inner plate members (57, 58) and which has plural fluid passage bores for connecting fluid passages in the outer plate member (57) and fluid passages in the inner plate member (58).

A number of fluid passages and ports are formed in the valve casing in correspondence with the plural control valves and pressure sensors, and when such fluid passages and ports are to be formed in a one-piece valve casing the shaping of such fluid passages and ports will be very complicated so that they are very difficult to machine. Contrary, fluid passages in the outer and inner plate members can be formed as grooves in an inner side surface of the outer plate member, at which surface the outer plate member is in abutment on the separator member, and in an outer side surface of the inner plate member, at which surface the inner plate member is in abutment on the separator member, and such grooves in the outer and inner plate members can be communicated through fluid passage bores in the separator member. Ports can be formed in the outer plate member and in the inner plate member such that they open into the grooves in the outer plate member and in the inner plate member at suitable positions of the grooves. Thus, the fluid passages and ports can be formed very easily.

BRIEF DESCRIPTION OF THE DRAWINGS

The present invention and its attendant advantages will become more readily apparent as the specification is considered in conjunction with the accompanying drawings in which.

DESCRIPTION OF A PREFERRED EMBODIMENT

Figure 1:
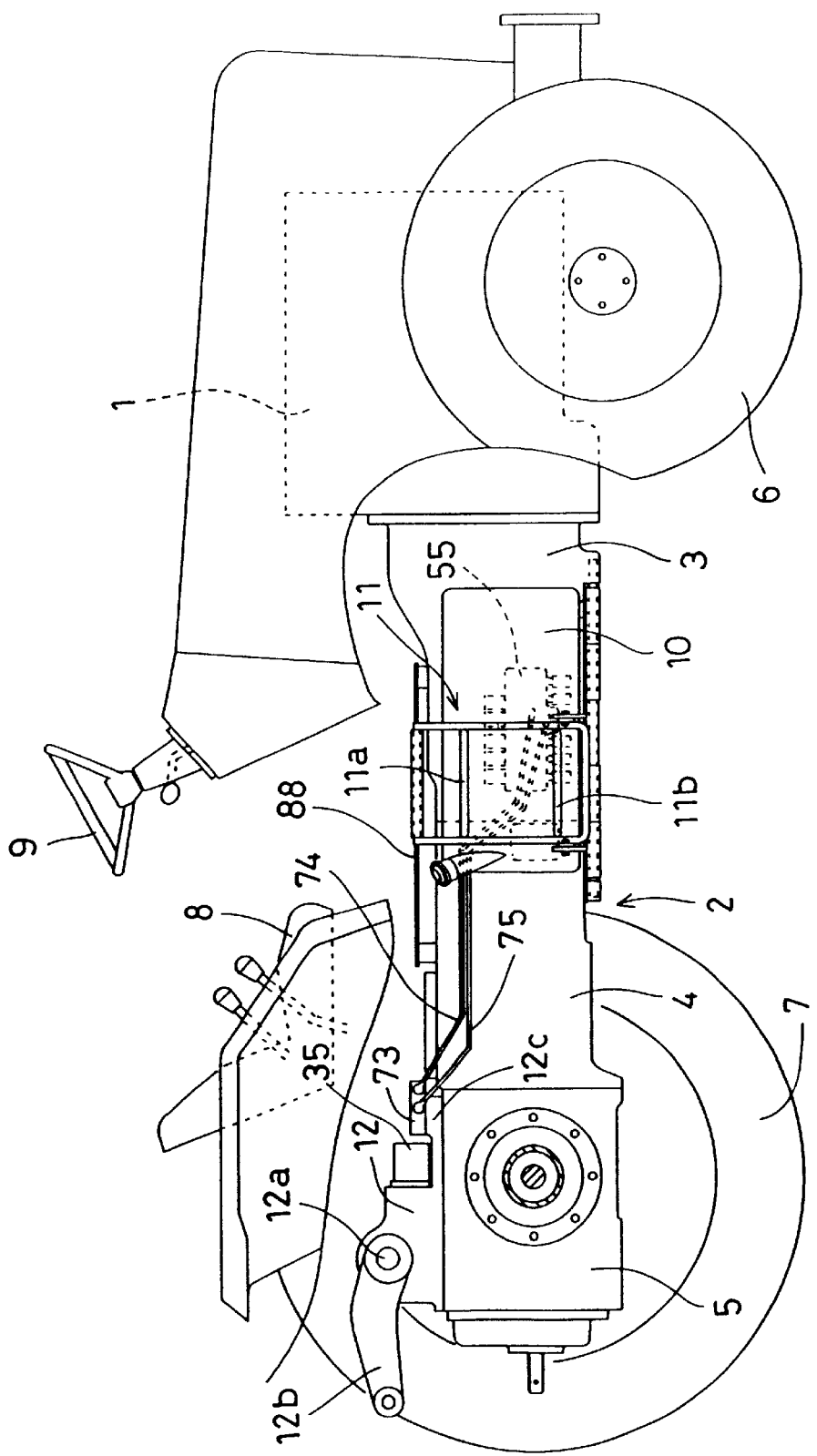
FIG. 1 is a side view, partially cut away and partially in section, of a tractor in which a preferred embodiment of the present invention is employed.

FIG. 1 depicts a tractor in which an embodiment of the present invention is employed. An engine 1 is mounted on a front most end of the tractor, and the vehicle body 2 is composed of a front housing 3, a middle housing 4 and a rear housing 5 which are arranged in series in a longitudinal direction of the tractor and are fastened together. Numerals 6 and 7 designate respectively left and right front wheels and left and right rear wheels. A seat 8 is provided at a location above a rear portion of the middle housing 4, and a steering wheel 9 for turning the left and right wheels 6 so as to steer the vehicle is provided at a location before the seat.

A pair of fuel tanks 10 for storing fuel for the engine 1 are provided at outside spaces of the front and middle housings 3 and 4. A pair of step frames 11 each having upper and lower steps 11a and 11b are provided at outsides of the fuel tanks. On an upper surface of the rear housing 5, there is provided a hydraulic lift case 12 having left and right lift arms 12b which are rotatable about a lift arm shaft 12a together with the arm shaft.

Figure 2:
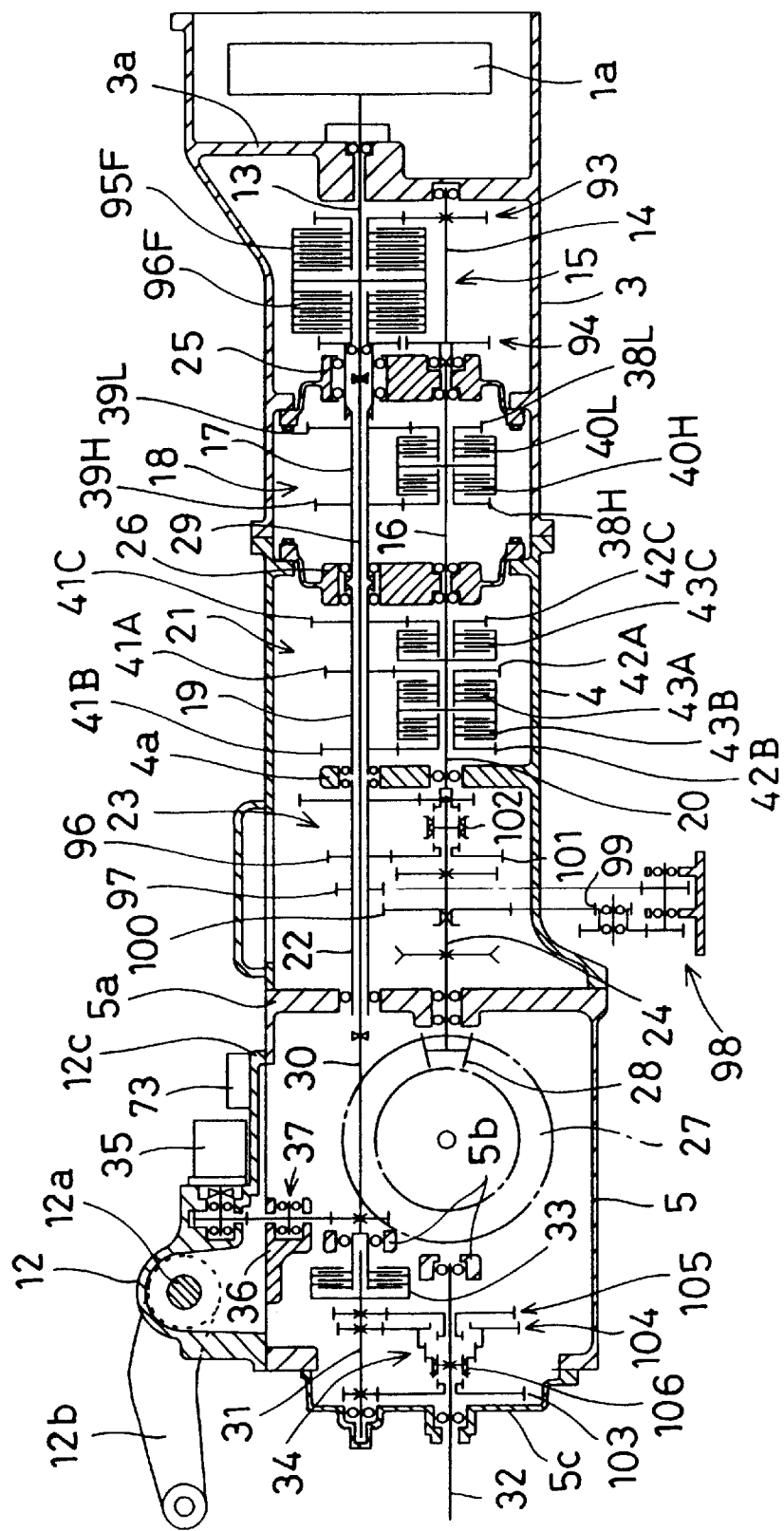
FIG. 2 is a diagram showing a transmission system employed in the tractor.

FIG. 2 depicts the transmission system employed in the tractor. A primary drive shaft 13, which is driven to rotate by an engine flywheel 1a, is provided, and a vehicle drive transmission line and a PTO (power take-off) transmission line are branched from the primary drive shaft 13. The vehicle drive transmission line includes a direction-reversing mechanism 15 disposed between the primary drive shaft 13 and an output shaft 14 which is arranged below the primary drive shaft. The drive transmission line further includes a first fluid-operated speed change mechanism 18 and a second fluid-operated speed change mechanism 21 which are connected in series to each other. The first fluid-operated speed change mechanism 18 is disposed between a first drive shaft 16, which is arranged co-axially with and is connected to the output shaft 14, and a hollow first driven shaft 17 which is arranged co-axially with the primary drive shaft 13. The second fluid-operated speed change mechanism 21 is disposed between a hollow second drive shaft 19, which is arranged co-axially with and is connected to the first driven shaft 17, and a second driven shaft 20 which is arranged co-axially with the first drive shaft 16. Further, the drive transmission line includes a mechanical speed change mechanism 23 which comprises a hollow counter shaft 22 arranged co-axially with the second drive shaft 19 and which is disposed between the second driven shaft 20 and a propeller shaft 24 arranged co-axially with the second driven shaft. The direction-reversing mechanism 15 and first fluid-operated speed change mechanism 18 are disposed within front and rear portions of the front housing 3, and the second fluid-operated speed change mechanism 21 and mechanical speed change mechanism 23 are disposed within front and rear portions of the middle housing 4.

For supporting the above-referenced transmission shafts, there are employed an internal partition wall 3a at a front portion of the front housing 3, a first bearing support frame 25 which is attached to the front housing 3 at an intermediate portion thereof, a second bearing support frame 26 which is attached to the middle housing 4 at a front portion thereof, an internal support wall 4a at an intermediate portion of the middle housing 4, and a front wall 5a of the rear housing 5. A rear end of the propeller shaft 24 extends into the rear housing 5 and has a bevel pinion 28 which is meshed with an input bevel gear 27 of a differential gearing (not shown) for the left and right rear wheels.

The PTO transmission line includes a transmission shaft 29, which is connected at its front end to the primary drive shaft 13 and which extends through the hollow first driven shaft 17, second drive shaft 19 and counter shaft 22, another transmission shaft 30 which is connected to the transmission shaft 29 at a front end portion of the rear housing 5, a further transmission shaft 31 which is arranged co-axially with the transmission shaft 30, and a PTO shaft 32 which extends rearwardly from the rear housing 5. A fluid-operated PTO clutch 33 is disposed between the transmission shafts 30 and 31, and a mechanical PTO speed change mechanism 34 is disposed between the transmission shaft 31 and the PTO shaft 32. For supporting the above-referenced shafts of PTO transmission line, there are employed the front wall 5a of rear housing 5, an internal support wall 5b of the rear housing 5, and a rear cover 5c which closes a rear end opening of the rear housing 5.

A hydraulic pump 35 is attached to a front surface of the hydraulic lift case 12. This pump 35 is driven by the transmission shaft 30 through a gear train 37 including an intermediate gear which is rotatably supported by a support plate 36 secured to the lift case 12.

As also shown in FIG. 2, the first fluid-operated speed change mechanism 18 comprises two gears 38H and 38L which are rotatably mounted on the first drive shaft 16, and two gears 39H and 39L which are fixedly mounted on the first driven shaft 17 and are meshed respectively with the corresponding gears on the first drive shaft. For coupling the gears 38H and 38L one at a time to the drive shaft 16, two fluid-operated clutches 40H and 40L are mounted on the first drive shaft 16. The second fluid-operated speed change mechanism 21 comprises three gears 41A, 41B and 41C which are fixedly mounted on the second drive shaft 19, and three gears 42A, 42B and 42C which are rotatably mounted on the second driven shaft 20 and are meshed respectively with the corresponding gears on the second drive shaft. For coupling the gears 42A, 42B and 42C one at a time to the driven shaft 20, three fluid-operated clutches 43A, 43B and 43C are mounted on the second driven shaft 20. Thus, six speed change ratios can be obtained by selectively operating one of the fluid-operated clutches of first fluid-operated speed change mechanism 18 and one of the fluid-operated clutches of second fluid-operated speed change mechanism 21.

Figure 3:
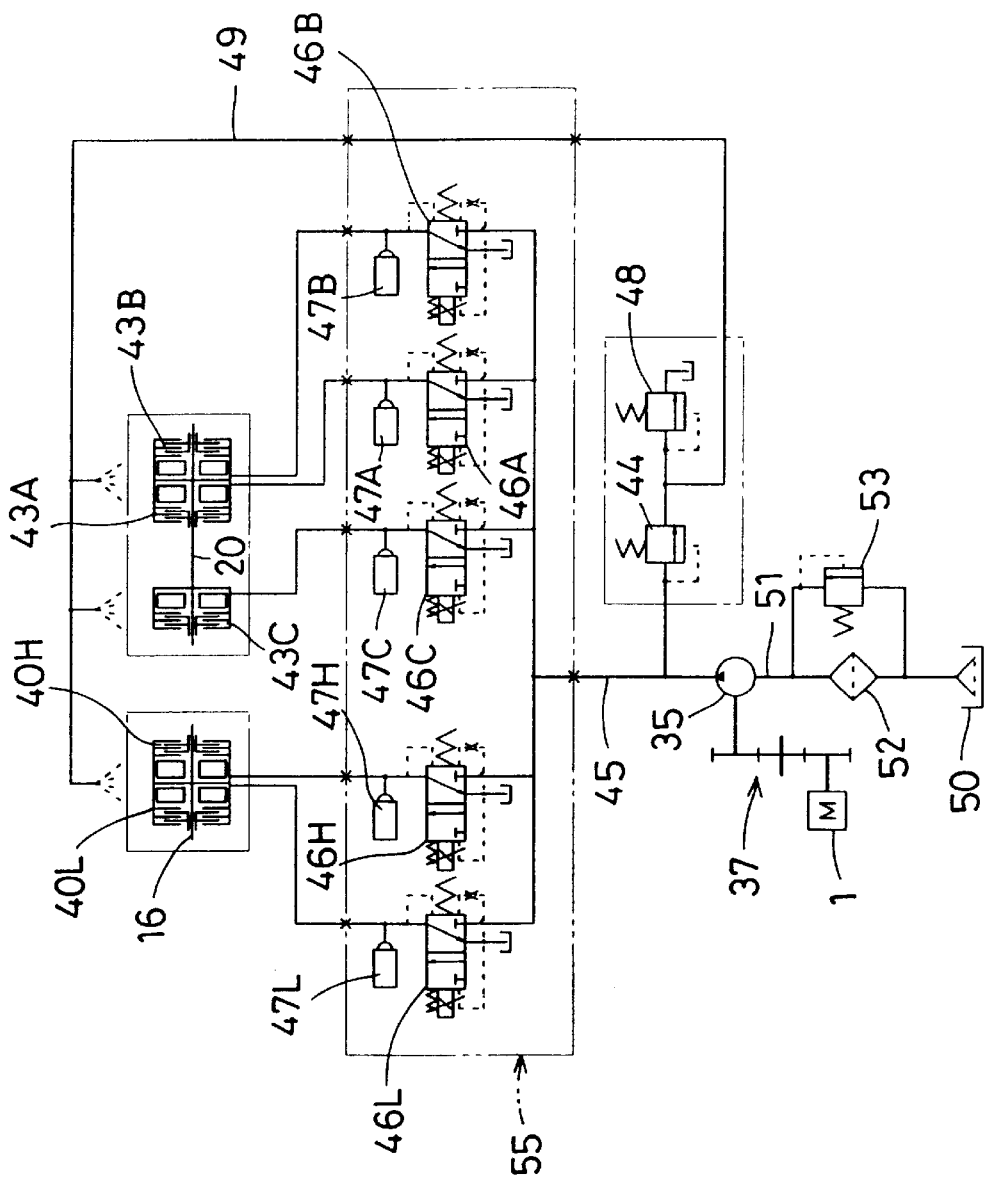
FIG. 3 is a circuit diagram showing a fluid circuit for first and second fluid-operated change mechanisms employed in the tractor.

FIG. 3 depicts a fluid circuit for the first and second fluid-operated speed change mechanisms 18 and 21. A fluid supply path 45, the pressure in which is determined by a relief valve 44, is connected to the pump 34. To the fluid supply path 45, there are connected five electromagnetic proportional direction control valves 46H, 46L, 46A, 46B and 46C which in turn are connected respectively to the five fluid-operated clutches 40H, 40L and 43A, 43B, 43C of the first and second fluid-operated speed change mechanisms 18 and 21. Each of the direction control valves 46H, 46L, 46A, 46B and 46C has a neutral position shown and an operative position to which each control valve is displaced by the energization of a solenoid so as to supply fluid to each of the fluid-operated clutches 40H, 40L, 43A, 43B and 43C and to thereby engage the same. Each of these direction control valves 46H, 46L, 46A, 46B and 46C is operable to control fluid pressure applied to each of the fluid-operated clutches 40H, 40L, 43A, 43B and 43C optionally in response to a command signal as from the time when each control valve is displaced to its operative position. Each of the direction control valves 46H. 46L, 46A, 46B and 46C is further operable to reduce fluid pressure applied to each of the fluid-operated clutches 40H, 40L, 43A, 43B and 43C to zero in an optional pressure-reducing characteristic in response to a command signal as from the time when each control valve is returned to its neutral position.

Pressure sensors 47H, 47L, 47A, 47B and 47C are connected respectively to fluid paths between the direction control valves 46H, 46L, 46A, 46B and 46C and the fluid-operated clutches 40H, 40L, 43A, 43B and 43C. Each of the pressure sensors 47H, 47L, 47A, 47B and 47C is connected, together with each of the direction control valves 46H, 46L, 46A, 46B and 46C, to an electric control circuit (not shown) such that, when fluid pressure applied to a fluid-operated clutch to be disengaged is kept, after a disengaging command is given, higher than the fluid pressure corresponding to the maximum allowable absorption energy of frictional elements of the fluid-operated clutch for a predetermined interval of time due to a trouble in the fluid circuit, engaging commands to all the solenoids of direction control valves 46H, 46L, 46A, 46B and 46C are cut off so as to prevent abnormal double engagements of fluid-operated clutches and to thereby prevent the damage of gears and fluid-operated clutches.

A secondary relief valve 48 is connected to the drain side of the relief valve 44 for determining lubricant pressure, and a lubricant supply path 49 is branched from the path between the relief valves 44 and 48 for supplying lubricant to the frictional elements of fluid-operated clutches 40H, 40L, 43A, 43B and 43C. In a fluid suction path 51 which suctions fluid from a fluid reservoir 50, for which a lower part of the interior of the vehicle body 2 is utilized, by the operation of pump 35, there are incorporated a line filter 52 and a bypass or relief valve 53 which are connected in parallel to each other. The relief valve 53 is operable, when the line filter 52 is choked, to keep the flow of fluid to the hydraulic pump 35.

Figure 4:
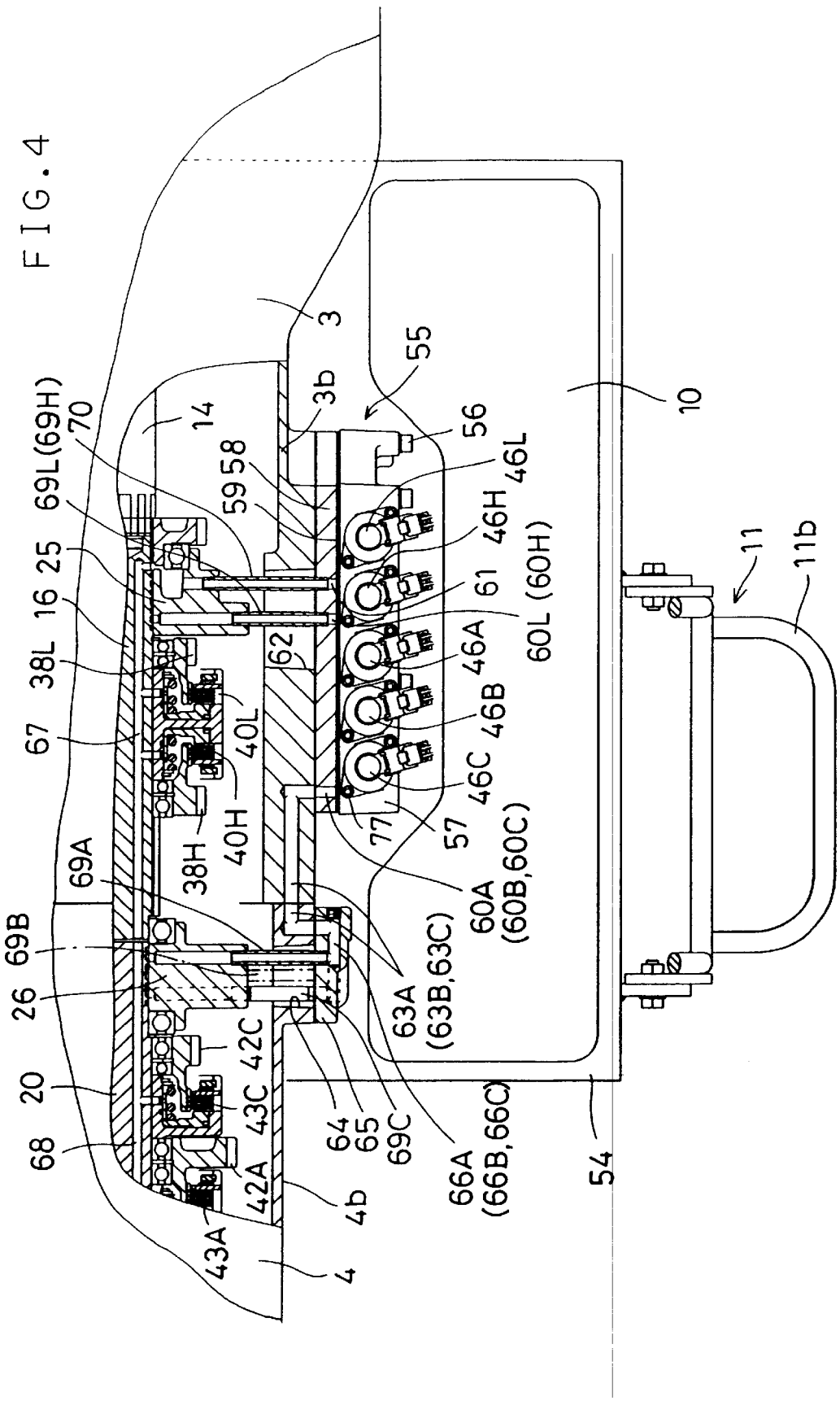
FIG. 4 is a sectional plane view of a part of the tractor.
Figure 5:
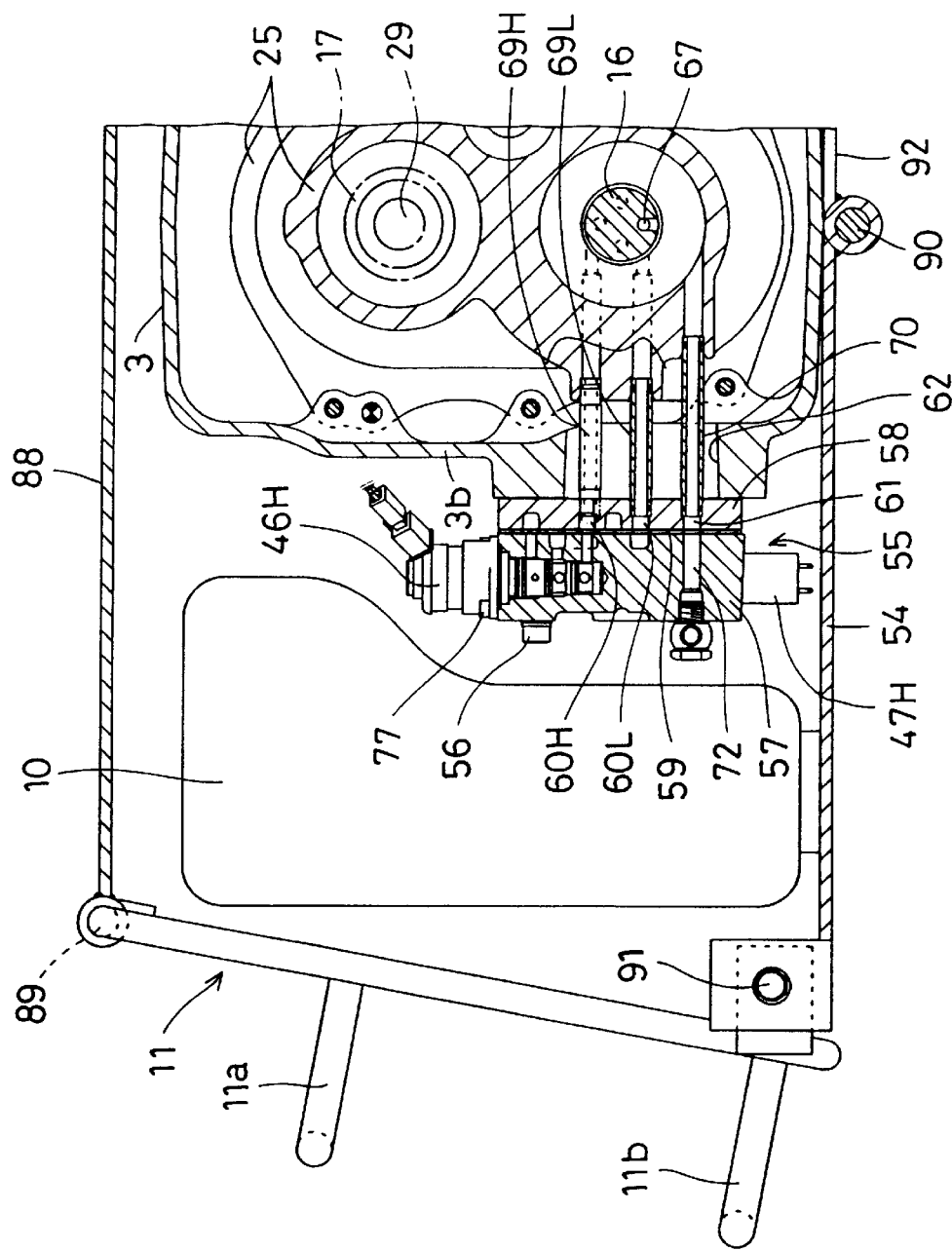
FIG. 5 is a sectional front view of the part shown in FIG. 4.

As shown in FIGS. 4 and 5, the fluid tank 10 at one side of the vehicle body 2 is fixedly mounted on a base plate 54 and is located at an outer side of side walls 3b and 4b of the front housing 3 and middle housing 4. A valve casing 55 is arranged at an inside of the fuel tank 10 and is fixedly secured to a lower half of the side wall 3b of front housing 3 using bolts 56. The valve casing 55 is composed of an outer plate member 57, an inner plate member 58, and a thin separator member 59 interposed between the plate members 57 and 58. The electromagnetic proportional direction control valves 46H, 46L, 46A, 46B and 46C are arranged at an upper side of the outer plate member 57 in parallel in a longitudinal direction of the vehicle body, whereas the pressure sensors 47H, 47L, 47A, 47B and 47C are arranged at a lower side of the outer plate member 57 in parallel in a longitudinal direction of the vehicle body. The inner plate member 58 includes three ports 60H, 60L and 61, which are located at a front portion of the plate member 58 and which open at an inner side surface of the plate member 58, and another three ports 60A, 60B and 60C which are located at a rear portion of the plate member 58 and which open at an inner side surface of the plate member 58. The side wall 3b of front housing 3 includes an opening 62, and the side wall 4b of middle housing 4 includes an opening 64 which is closed by a cover member 65. The three ports 60H, 60L and 61 in the front portion of inner plate member are faced to the opening 62. The three ports 60A, 60B and 60C in the rear portion of inner plate member are communicated respectively via fluid passages 63A, 63B and 63C in the side walls 3b and 4b to three fluid passages 66A, 66B and 66C which are formed in the cover member 65 such that these passages open at an inner surface of the cover member.

As is usual, the first drive shaft 16 includes two operating fluid passages (not shown) for supplying operating fluid to the fluid-operated clutches 40H and 40L on the first drive shaft and the second driven shaft 20 includes three operating fluid passages (not shown) for supplying operating fluid to the fluid-operated clutches 43A, 43B and 43C on the second driven shaft. The first drive shaft 16 further includes a lubricant passage 67 for supplying lubricant to the frictional elements of fluid-operated clutches 40H and 40L, and the second driven shaft 20 further includes a lubricant passage 68 for supplying lubricant to the frictional elements of fluid-operated clutches 43A, 43B and 43C. These lubricant passages 67 and 68 are communicated to each other by a clearance between the first drive shaft 16 and the second driven shaft 20. Three rotary joint portions are formed between the first drive shaft 16 and the first bearing support frame 25 for communicating the three passages in the first drive shaft 16 to the three stationary fluid passages, and three rotary joint portions are formed between the second driven shaft 20 and the second bearing support frame 26 for communicating three fluid passages in the second driven shaft 20 to the stationary fluid passages. Three pipes 69H, 69L and 70 are bridged between the casing 55 and the first bearing support frame 25 for communicating between the three ports 60H, 60L and 61 and the three rotary joint portions in the first bearing support frame 25, and another three pipes 69A, 69B and 69C are bridged between the cover member 65 and the second bearing support frame 26 for communicating between the three fluid passages 66A, 66B and 66C and the three rotary joint portions in the second bearing support frame 26. The openings 62 and 64 in the side walls 3b and 4b are faced respectively to the first and second bearing support frames 25 and 26, and the pipes 69H, 69L, 70 and 69A, 69B, 69C extend respectively through the openings 62 and 64.

Figure 6:
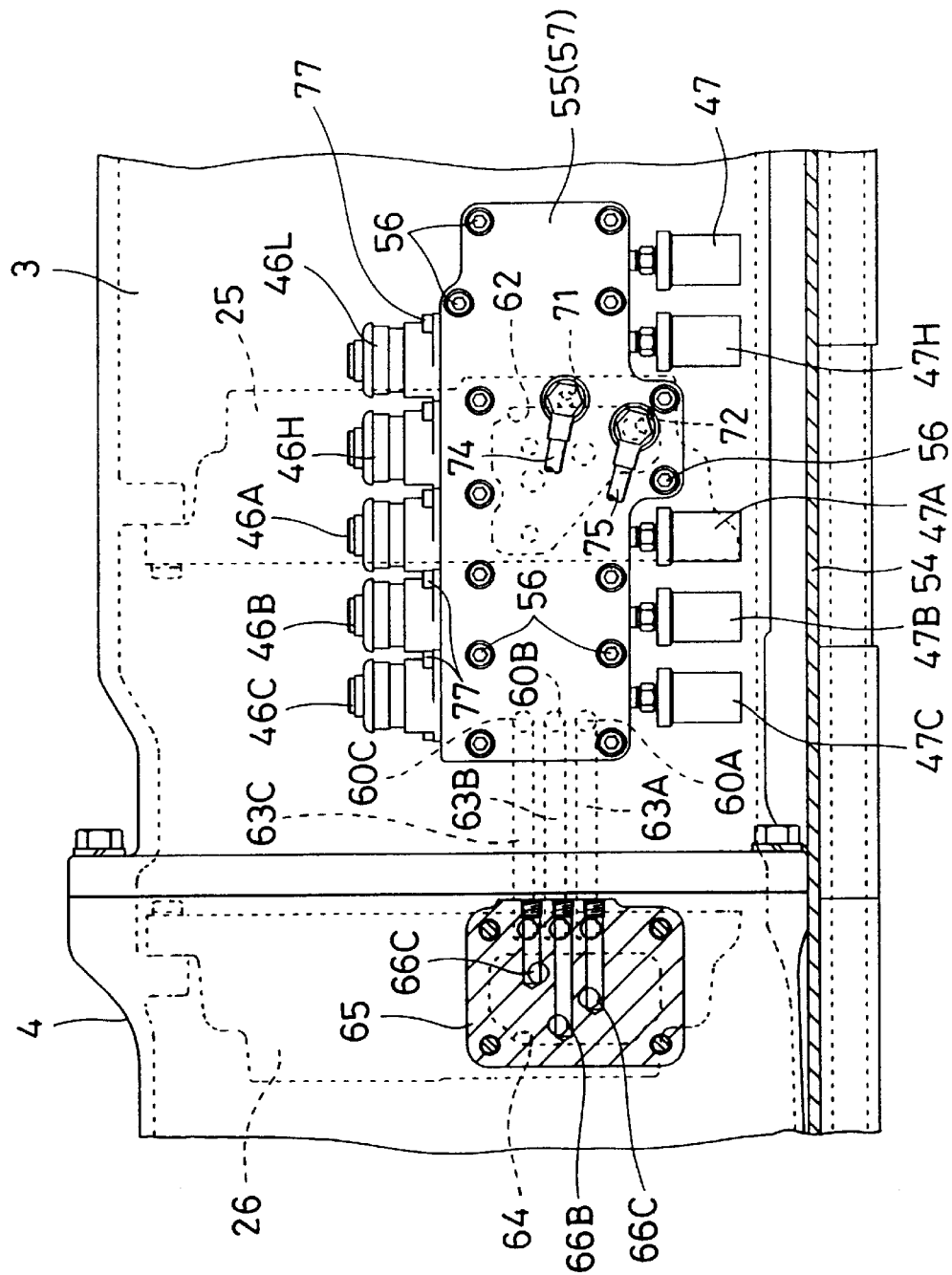
FIG. 6 is a sectional side view of the part shown in FIGS. 4 and 5.

As shown in FIG. 6, the valve casing 55 includes a fluid inlet port 71 and a lubricant inlet port 72 which open at an outer side surface of the outer plate member 57. As shown in FIGS. 1 and 2, the hydraulic lift case 12 includes a forward extension 12c on which there is mounted a valve housing 73 which houses the relief valves 44 and 48 shown in FIG. 3. As shown in FIGS. 1 and 6, there are provided a fluid supply pipe 74 and a lubricant supply pipe 75 for connecting between the valve housing 73 and the inlet ports 71 and 72 of the casing 55.

Figure 7:
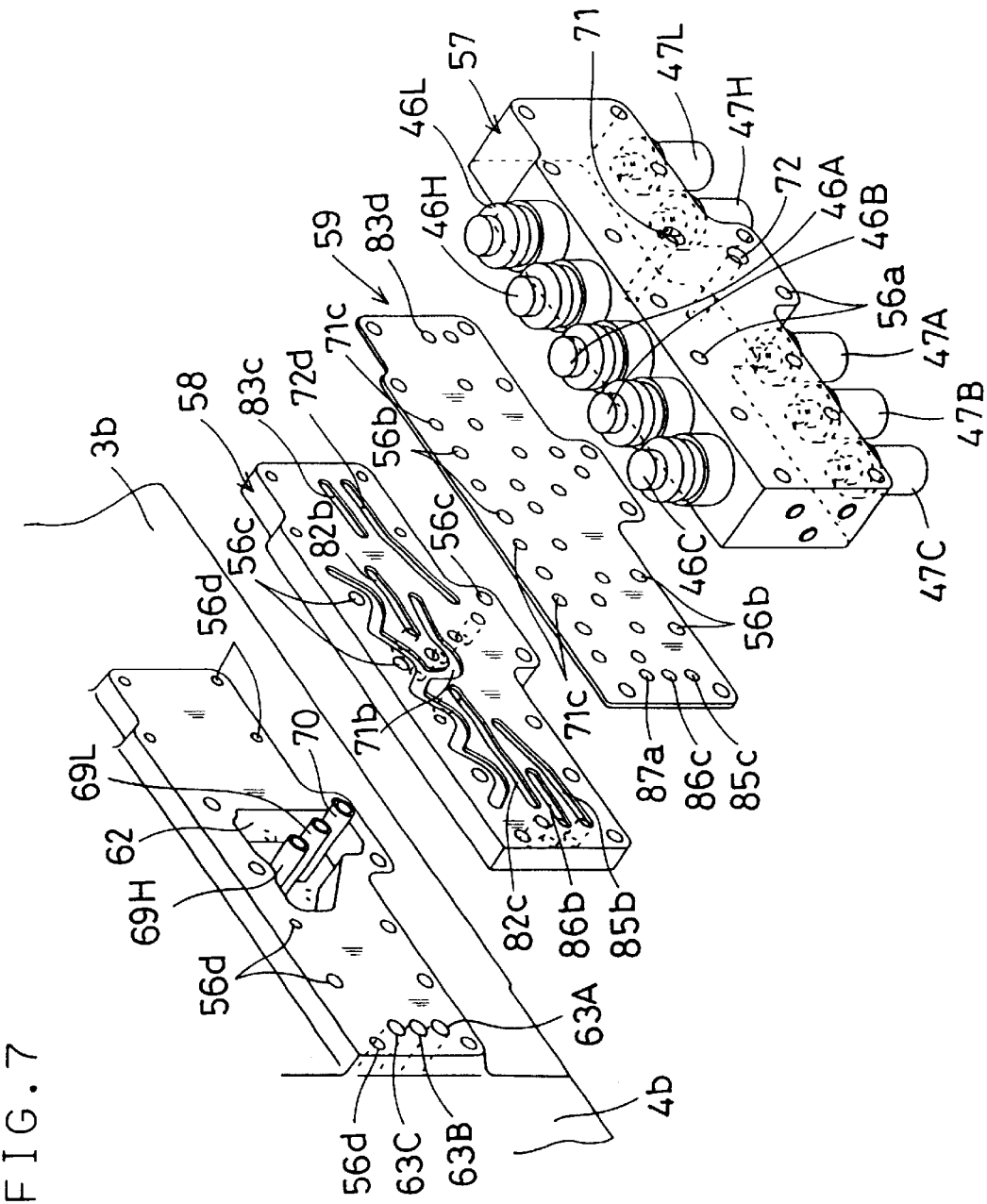
FIG. 7 is an exploded perspective view of a part of the tractor.
Figure 8:
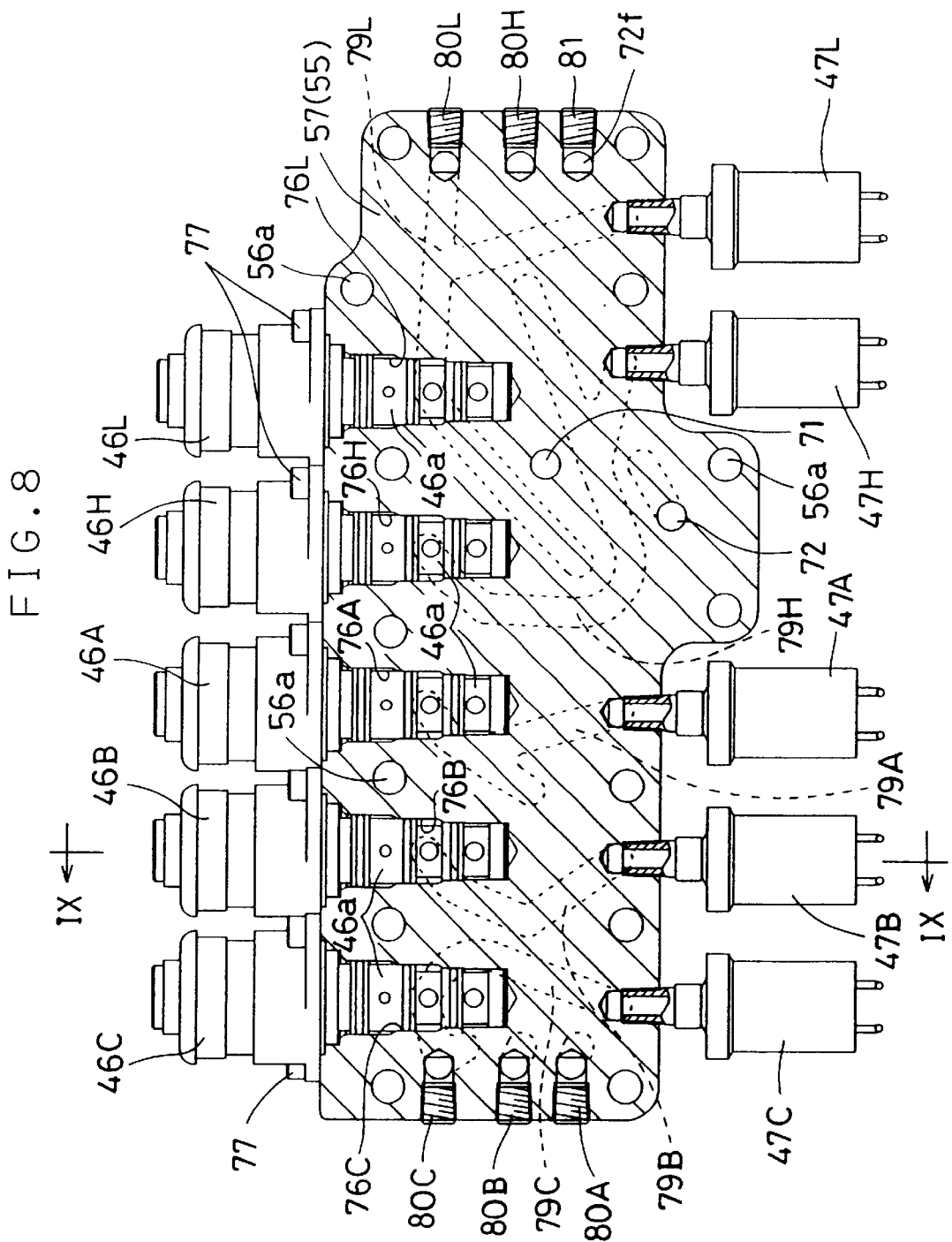
FIG. 8 is a a sectional side view of a valve casing employed in the tractor.
Figure 9:
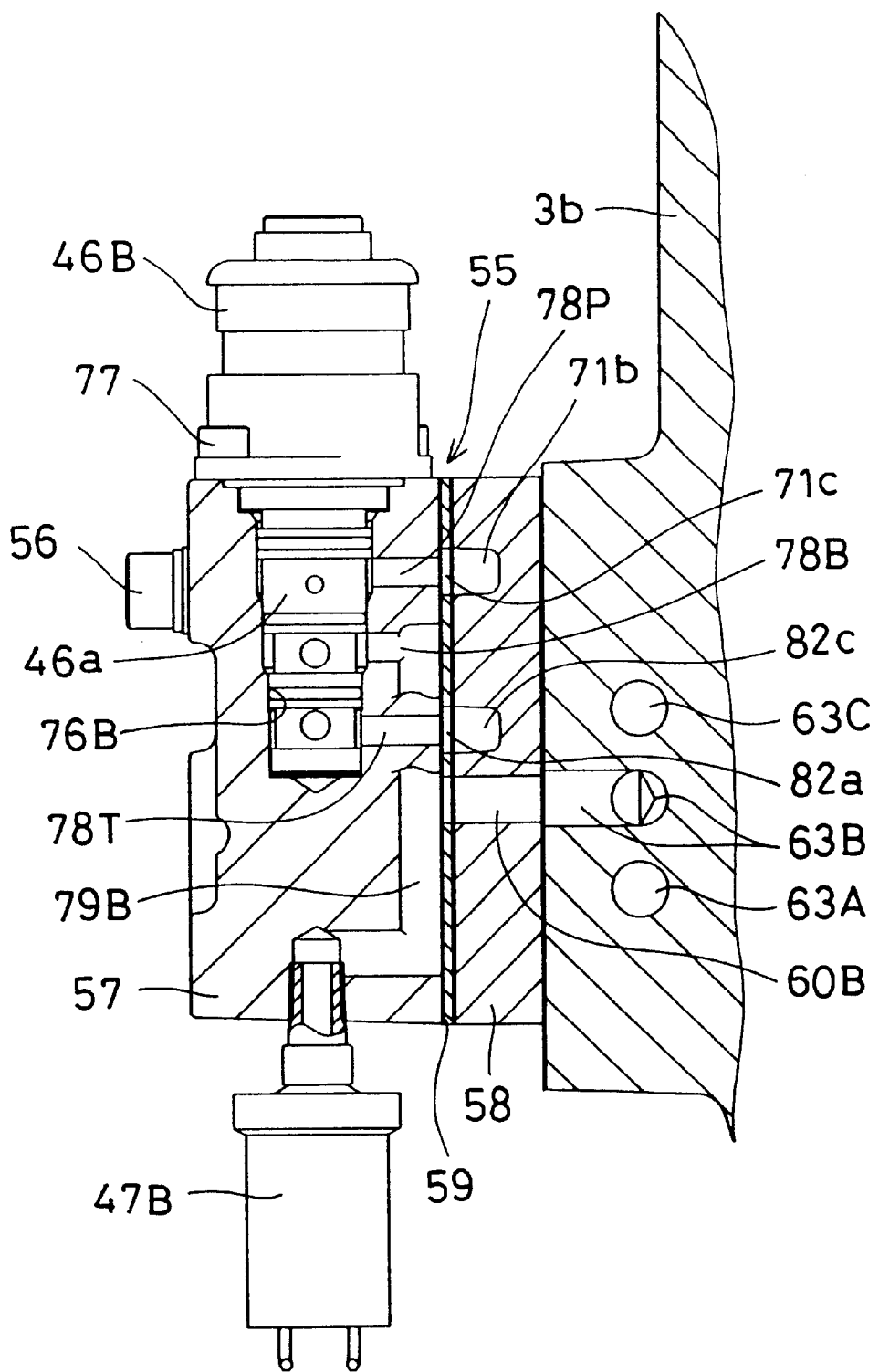
FIG. 9 is a sectional view taken along line IX—IX of FIG. 8.

The structure of valve casing 55 will be detailed hereinafter. As shown in FIG. 7, the casing 55 is fixedly secured to a thick portion of the side wall 3b of front housing 3 by the bolts 56 which extend through bolt-passing bores 56a, 56b and 56c in the outer plate member 57, separator member 59 and inner plate member 58 and which are threadingly engaged to threaded bores 56d in the side wall 3b. As shown in FIG. 8, the electromagnetic proportional direction control valves 46H, 46L, 46A, 46B and 46C are secured to an upper surface of the outer plate member 57 in a condition such that their plundger portions 46a are inserted into valve-inserting bores 76H, 76L, 76A, 76B and 76C which are formed from the upper surface of outer plate member. As shown in FIG. 9 with respect to the direction control valve 46B, the outer plate member 57 includes inlet ports 78P, outlet ports 78B (78H, 78L, 78A, 78C) and drain ports 78T which open into the respective valve-inserting bores 76H, 76L, 76A, 76B and 76C. Each outlet port 78B (78H, 78L, 78A, 78C) is communicated to each drain port 78T in a neutral position of each plundger portion 46a shown, whereas each inlet port 78P is communicated to each outlet port 78B (78H, 78L, 78A, 78C) in an operative position of each plundger portion 46a where the plundger portion is displaced by its downwardly projecting movement.

As shown in FIGS. 8 and 9, the pressure sensors 47H, 47L, 47A, 47B and 47C are secured to the outer plate member 57 by threadingly engaging their end portions to threaded bores which are formed in the outer plate member 57 from a lower surface thereof. The outer plate member 57 includes in its inner surface grooves 79H, 79L, 79A, 79B and 79C which communicate respectively between the outlet ports 78H, 78L, 78A, 78B and 78C and the above-referenced threaded bores, so that respective fluid pressure applied to the fluid-operated clutches 40H, 40L, 43A, 43B and 43C can be sensed by the respective pressure sensors 47H, 47L, 47A, 47B and 47C. As shown in FIG. 8, gauge attachment bores 80H, 80L, 81 and 80A, 80B, 80C are formed in front and rear end surfaces of the outer plate member 57. The gauge attachment bores 80H, 80L, 80A, 80B and 80C communicate respectively with the grooves 79H, 79L, 79A, 79B and 79C, whereas the groove attachment bore 81 communicates with the lubricant supply port 72. Pressure gauges (not shown) are attached respectively to these gauge attachment bores for measuring fluid pressure applied to the fluid-operated clutches 40H, 40L, 43A, 43B and 43C and for measuring fluid pressure of the lubricant.

Figure 10:
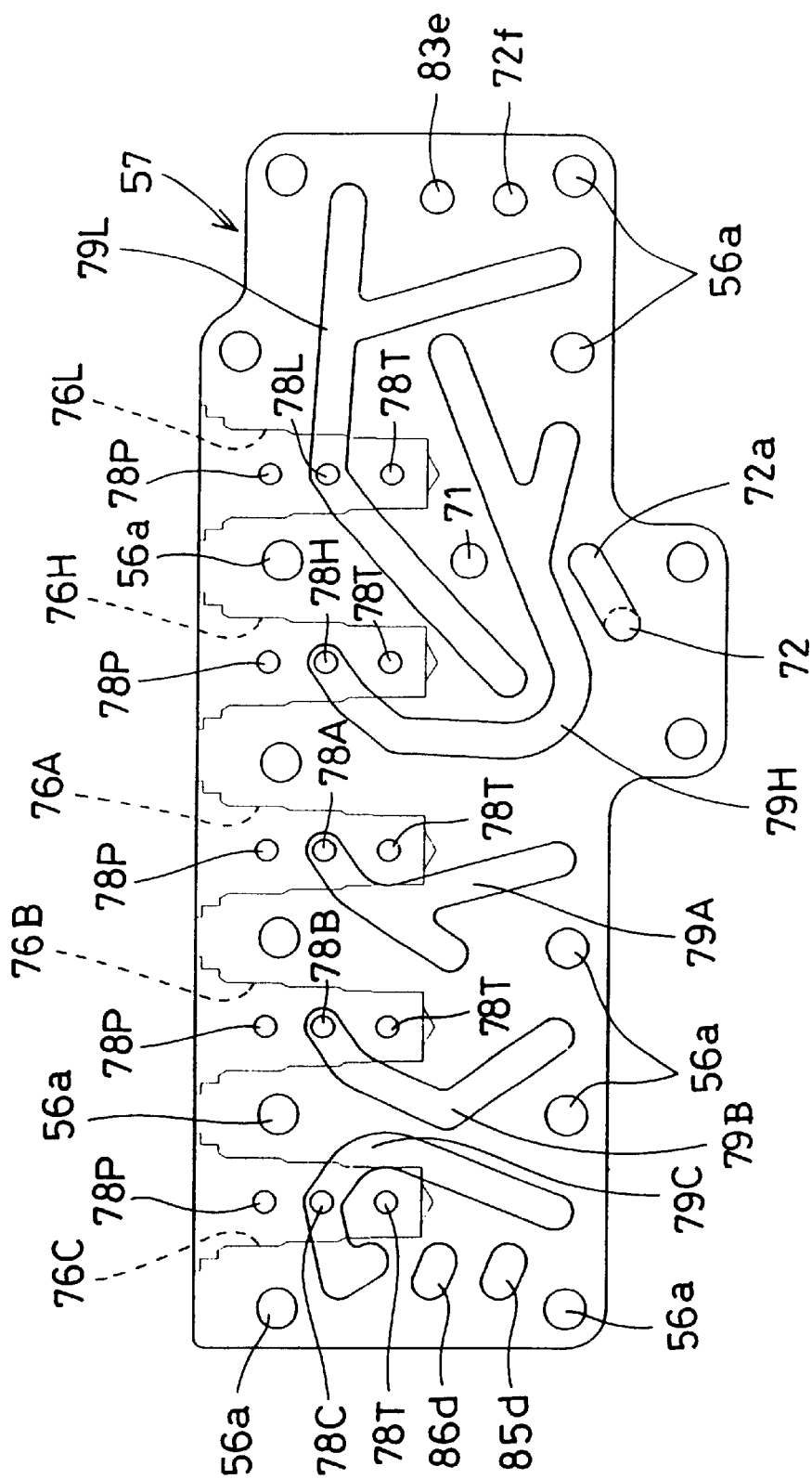
FIG. 10 is a side view showing an inner side surface of an outer plate member of the valve casing.
Figure 11:
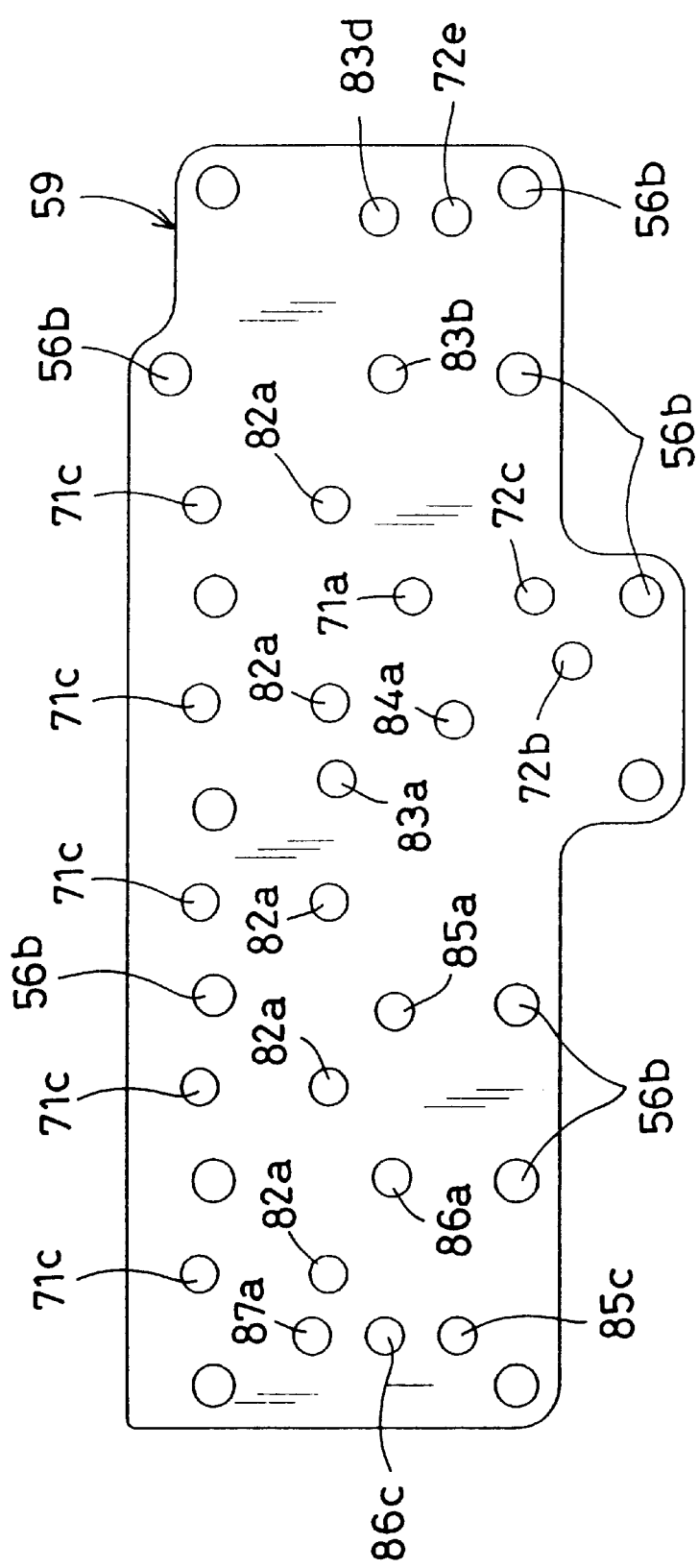
FIG. 11 is a side view showing a separator member of the valve casing.
Figure 12:
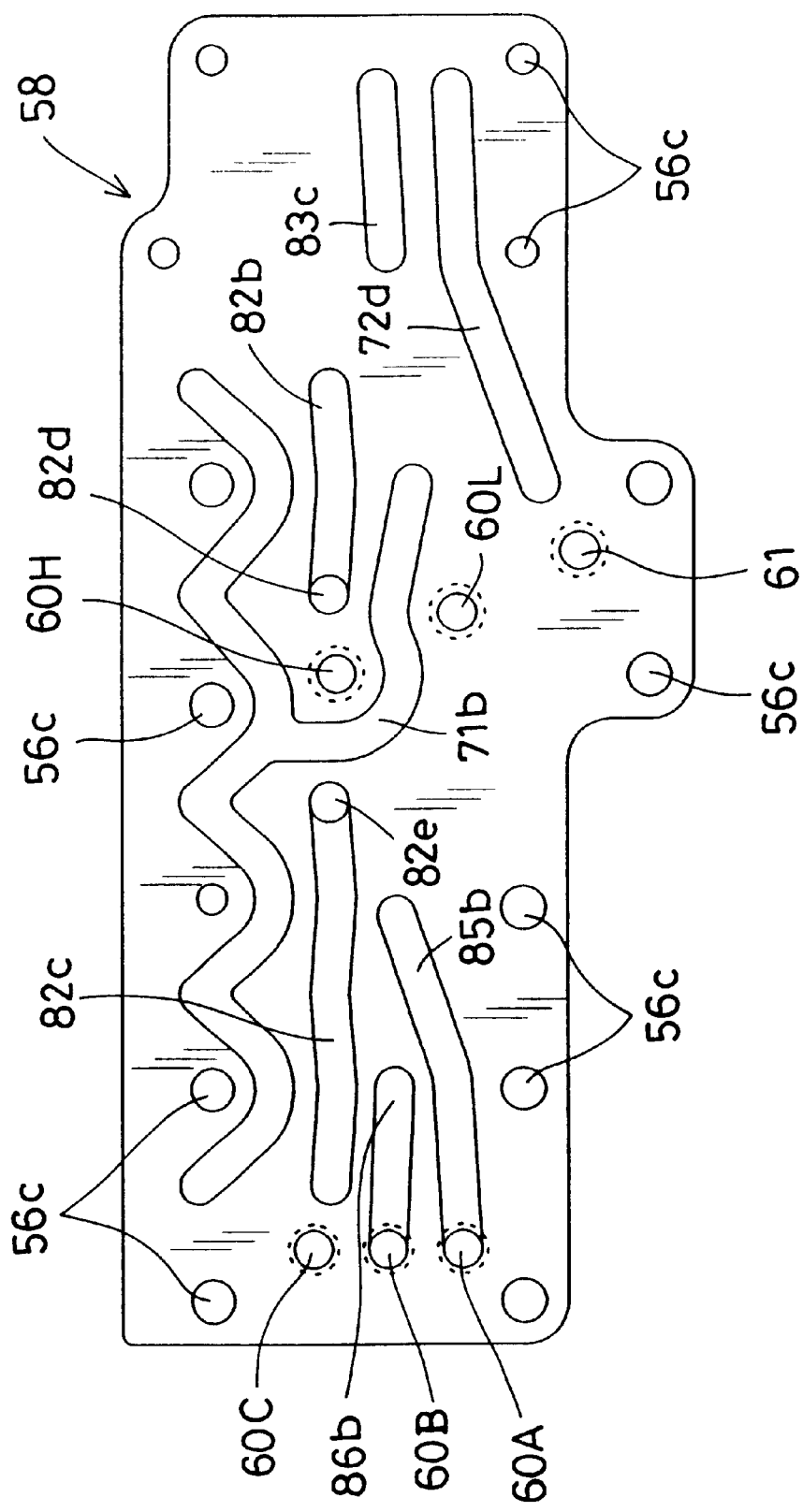
FIG. 12 is a side view showing an outer side surface of an inner plate member of the valve casing.
Figure 13:
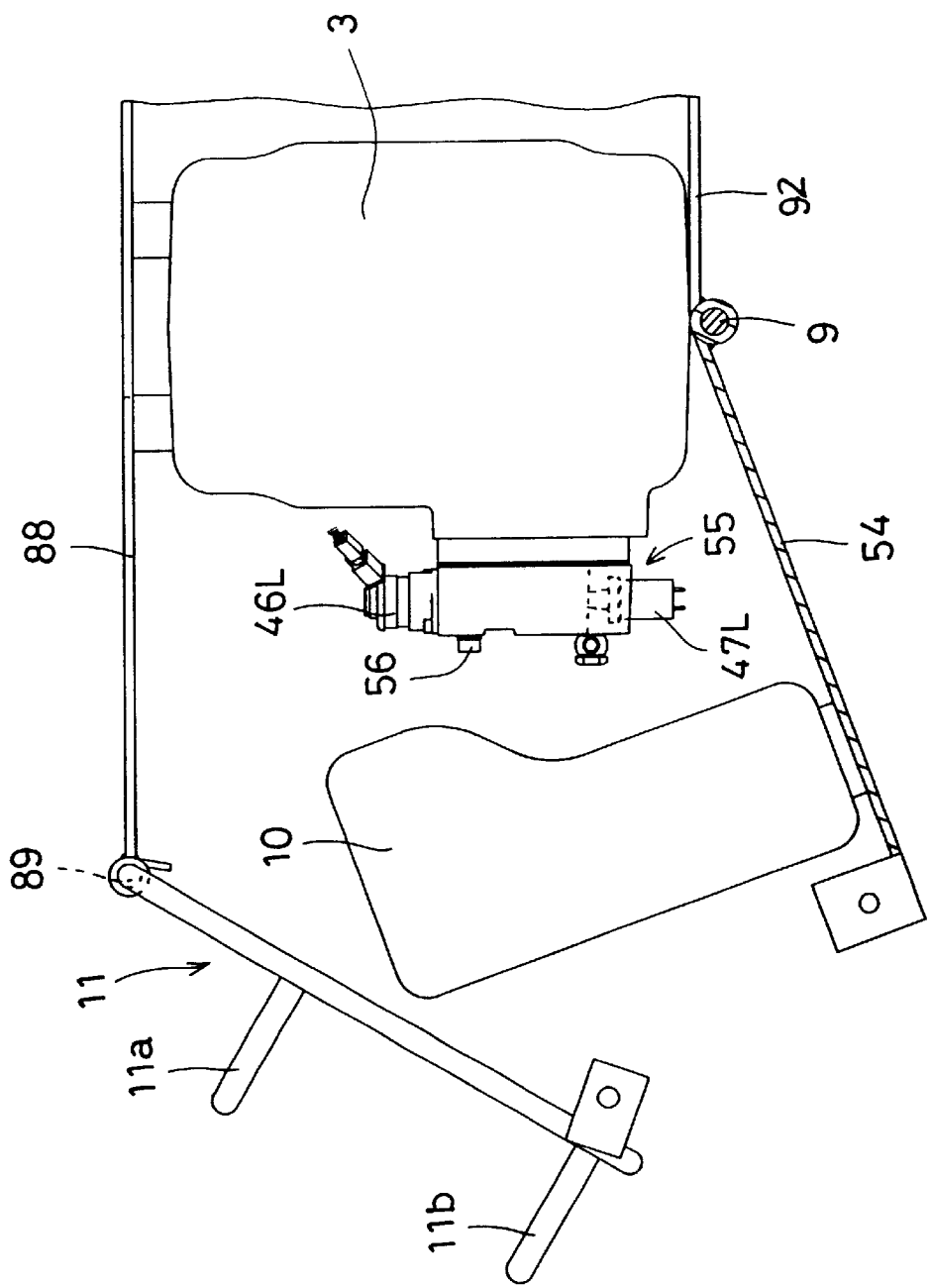
FIG. 13 is a sectional front view of the part shown in FIG. 5 but showing another state.

Fluid passages in the valve casing 55 will be described in great detail by refering to FIGS. 10, 11 and 12 which depict respectively the inner side surface of outer plate member 57, the outer or inner side surface of separator member 59 and the outer side surface of inner plate member 58. The fluid supply port 71 extends through the outer plate member 57 and is communicated to a groove 71b in the outer side surface of inner plate member 58 through a fluid passage bore 71a in the separator member 59. The groove 71b extends to five positions corresponding to the positions, where valve-inserting bores 76H, 76L, 76A, 76B and 76C in the outer plate member 57 are provided, and is communicated at those positions respectively to the inlet ports 78P in the outer plate member 57 through five fluid passage bores 71c in the separator plate 59. The lubricant supply port 72 opens into a short groove 72a in the inner side surface of outer plate member 57 and is communicated at the position, where the port 72 is provided, directly to the port 61 in the inner plate member 58 through a fluid passage bore 72b in the separator member 59. The groove 72a is communicated to a groove 72d in the outer side surface of inner plate member 58 through a fluid passage bore 72c in the separator member 59, and the groove 72d is in turn communicated through a fluid passage bore 72e in the separator member 59 to a groove 72f which is formed in the inner side surface of outer plate member 57 such that it communicates with the gauge attachment bore 81.

The five drain ports 78T in the outer plate member 57 are communicated to two grooves 82b and 82c in the outer side surface of inner plate member 58 through five fluid passage bores 82a in the separator member 59. The grooves 82b and 82c extend respectively to the position, where the opening 62 in the side wall 3b is provided, and are communicated directly to the interior of front housing 3 through bores 82d and 82e in the inner plate member 58.

The grooves 79H, 79L, 79A, 79B and 79C, formed in the inner surface of outer plate member 57 and communicating with the outlet ports 78H, 78L, 78A, 78B and 78C, extend respectively to the treaded bores at which the pressure sensors 47H, 47L, 47A, 47B and 47C are secured to the outer plate member. The groove 79H is communicated at its intermediate portion to the port 60H in the inner plate member 58 through a fluid passage bore 83a in the separator member 59. The groove 79H is further communicated through a fluid passage bore 83b in the separator member 59 to a groove 83c in the outer side surface of inner plate member 58, and the groove 83c is communicated through a fluid passage bore 83d in the separator member 59 to a bore 83e which is formed in the inner side surface of outer plate member 57 such that it communicates with the gauge attachment bore 80H. The groove 79L is communicated to the port 60L in the inner plate member 58 through a fluid passage bore 84a in the separator member 59. Further, this groove 79L extends to the gauge attachment bore 80L. The groove 79A is communicated to a groove 85b in the outer side surface of inner plate member 58 through a fluid passage bore 85a in the separator member 59, and the groove 85b is in turn communicated to the port 60A in the inner plate member 58 and also to a groove 85d, which is formed in the inner side surface of outer plate member 57 such that it communicates with the gauge attachment bore 80A, through a fluid passage bore 85c in the separator member 59. The groove 79B is communicated to a groove 86b in the outer side surface of inner plate member 58 through a fluid passage bore 86a in the separator member 59, and the groove 86b is in turn communicated to the port 60B in the inner plate member 58 and also to a groove 86d, which is formed in the inner side surface of outer plate member 57 such that it communicates with the gauge attachment bore 80B, through a fluid passage bore 86c in the separator member 59. The groove 79C is communicated to the port 60C in the inner plate member 58. Further, this groove 79C extends to the gauge attachment bore 80C.

As shown in FIG. 1, a feet-placing plate 88 is provided at a location above the front and middle housings 3 and 4 for placing the feet of an operator on the seat 8. As shown in FIG. 5, the step frame 11 is supported by a side end of the feet-placing plate 88 pivotally about an axis 89 so that the frame 11 can be rocked upwardly and downwardly about the axis 89. As also shown in FIG. 5, the base plate 54 for mounting the fuel tank 10 is supported by a bottom wall of the front housing 3 pivotally about an axis 90 so that the plate 54 can be rocked upwardly and downwardly about the axis 90. And, the step frame 11 and the base plate 54 are connected to each other by a lock bolt 91. Thus, as shown in FIG. 11, by removing the lock bolt 91, the step frame 11 can be rocked upwardly and the base plate 54 can be rocked downwardly so that the valve casing 55 can be accessed easily for its inspection and maintenance. The electromagnetic proportional direction control valves 46H, 46L, 46A, 46B and 46C and the pressure sensors 47H, 47L, 47A, 47B and 47C which are are surrounded by the feet-placing plate 84, base plate 54 and fuel tank 10 are not influenced by rain and springing mud, so that a reliable operation of these valves and sensors is assured. Another valve casing (not shown) for the direction-reversing mechanism 15, which is fashioned into a fluid-operated type, is mounted on the opposite side wall of vehicle body 2 and a similar fuel tank and a similar step frame are provided at an outside location of the another valve casing. This step frame and the base plate 92 for this fuel tank are supported in a similar manner.

The transmission system shown in FIG. 2 will be supplementarily described hereinafter. The direction-reversing mechanism 15 comprises a forward directional gear train 93 and a backward directional gear train 94 including an idler gear (not shown) which are disposed between the primary drive shaft 13 and the output shaft 14. A forward directional fluid-operated clutch 95F and a backward directional fluid-operated clutch 95R are mounted on the primary drive shaft 13 for selectively coupling gears, mounted rotatably on this shaft, of the forward and backward directional gear trains 95F and 95R.

The counter shaft 23 of mechanical speed change mechanism 23 is connected to the second driven shaft 20 through a speed reduction gearing and comprises two speed change gears 96 and 97 fixedly mounted thereon. Another speed change gear 99, which is connected to the change gear 97 through a speed reduction gear mechanism 98, is arranged at an outside location of the counter shaft 22. On the propeller shaft 24, there are mounted a shift gear 100, which can be meshed selectively with the change gear 99 and with the change gear 97, and a double-acting clutch 102 which is shiftable to a position, where a gear 101 meshed with the change gear 96 is coupled to the propeller shaft 24, and another position where the propeller shaft 24 is coupled directly to the second driven shaft 20. Thus, the mechanical speed change mechanism 23 has four speed change ratios.

The PTO speed change mechanism 34 comprises three speed change gear trains 103, 104 and 105 which are disposed between the transmission shaft 31 and the PTO shaft 32. A clutch 106 is mounted on the PTO shaft 32 for selectively operating the speed change gear trains 103, 104 and 105.

We claim:
1. In a working vehicle wherein the vehicle running speed is changed by the selective operation of plural fluid-operated clutches (40H, 40L, 43A, 43B, 43C), a speed change control device characterized in:
that a valve casing (55) is mounted on an outer side surface of a vehicle body (2) which includes in it said plural fluid-operated clutches, said valve casing having plural direction control valves (46H, 46L, 46A, 46B, 46C) for controlling the supply of operating fluid individually to said plural fluid-operated clutches and plural pressure sensors (47H, 47L, 47A, 47B, 47C) for respectively sensing fluid pressure applied to said plural fluid-operated clutches, said plural direction control valves being secured to said valve casing from one of upper and lower surfaces of said valve casing and said plural pressure sensors being secured to said valve casing from the other of said upper and lower surfaces of said valve casing.

2. The speed change control device as set forth in claim 1, wherein said plural direction control valves (46H, 46L, 46A, 46B, 46C) and said plural pressure sensors (47H, 47L, 47A, 47B, 47C) are arranged respectively in parallel in a longitudinal direction of said vehicle body (2).

3. The speed change control device as set forth in claim 1, wherein said valve casing (55) is composed of an outer plate member (57) to which said plural direction control valves (46H, 46L, 46A, 46B, 46C) and said plural pressure sensors (47H, 47L, 47A, 47B, 47C) are secured, an inner plate member (58) comprising plural output ports (60H, 60L, 60A, 60B, 60C) which are connected respectively to said plural fluid-operated clutches (40H, 40L, 43A, 43B, 43C), and a separator member (59) interposed between said outer and inner plate members and having plural fluid passage bores which connect between fluid passages in said outer plate member and fluid passages in said inner plate member.

4. The speed change control device as set forth in claim 3, wherein said outer plate member (57) includes a fluid inlet port (71) which opens at an outer side surface of said outer plate member and extends through said outer plate member, said fluid inlet port being communicated through a fluid passage bore (71a) in said separator member (59) to a groove (71b) in an outer side surface of said inner plate member (58) at which surface said inner plate member is in abutment on said separator member, said groove being communicated to fluid inlet ports (78P) of said direction control valves (46H, 46L, 46A, 46B, 46C) respectively through fluid passage bores (71C) in said separator member (59).

5. The speed change control device as set forth in claim 3 or 4, wherein an inner side surface of said outer plate member (57) at which surface said outer plate member is in abutment on said separator member (59) includes plural grooves (79H, 79L, 79A, 79B, 79C) which are in fluid communication respectively with fluid outlet ports (78H, 78L, 78A, 78B, 78C) of said direction control valves (46H, 46L, 46A, 46B, 46C) and with said pressure sensors (47H, 47L, 47A, 47B, 47C), said separator member (79) including fluid passage bores (83a, 84a, 85a, 86a, 87a) for communicating said grooves (79H, 79L, 79A, 79B, 79C) to said output ports (60H, 60L, 60A, 60B, 60C).

6. The speed change control device as set forth in claim 3 or 4, wherein an outer side surface of said inner plate member (58) at which surface said inner plate member is in abutment on said separator member (59) includes at least one groove (82b, 82c) which is communicated to drain ports (78T) of said direction control valves (46H, 46L, 46A, 46B, 46C) through fluid passage bores (82a) in said separator member (59), said at least one groove being communicated to an interior of said vehicle body (2) through at least one drain passage (82d, 82e) in said inner plate member (58) and through an opening (62) in a side wall (3b) of said vehicle body (2).

7. The speed change control device as set forth in claim 4, wherein said outer plate member (57) includes a lubricant inlet port (71) which opens at an outer side surface of said outer plate member and extends through said outer plate member, said lubricant inlet port being communicated through a fluid passage bore (72b) in said separator member (59) to a lubricant supply port (61) which is formed in said inner plate member (58) for supplying lubricant to said fluid-operated clutches (40H, 40L, 43A, 43B, 43C).

\* \* \* \* \*